No. 738,095. PATENTED SEPT. 1, 1903.
R. BYERS.
GAS CHECK AND VENT APPARATUS.
APPLICATION FILED MAR. 18, 1903.
NO MODEL.

Witnesses
J. M. Howard
C. Sedgwick

Inventor
Robt Byers
By his Attorney
A. P. Thayer

THE NORRIS PETERS CO., PHOTO-LITHO., WASHINGTON, D. C.

No. 738,095.

Patented September 1, 1903.

UNITED STATES PATENT OFFICE.

ROBERT BYERS, OF NEW YORK, N. Y.

GAS-CHECK AND VENT APPARATUS.

SPECIFICATION forming part of Letters Patent No. 738,095, dated September 1, 1903.

Application filed March 18, 1903. Serial No. 148,350. (No model.)

*To all whom it may concern:*

Be it known that I, ROBERT BYERS, a citizen of the United States of America, and a resident of the borough of Manhattan, New York city, State of New York, have invented certain new and useful Improvements in Gas-Check and Vent Apparatus, of which the following is a specification.

My invention comprises a device adapted for checking the regurgitating action of gas on the meter which sometimes occurs and effects erroneous register of measure and also adapted for the purposes of a vent-cock for steam and hot-water registers, the said device being interchangeable for either use, as hereinafter described, reference being made to the accompanying drawings, in which—

Figure 1:
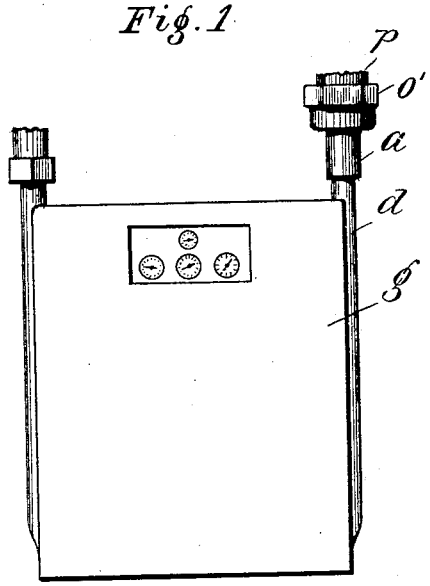
Figure 2:
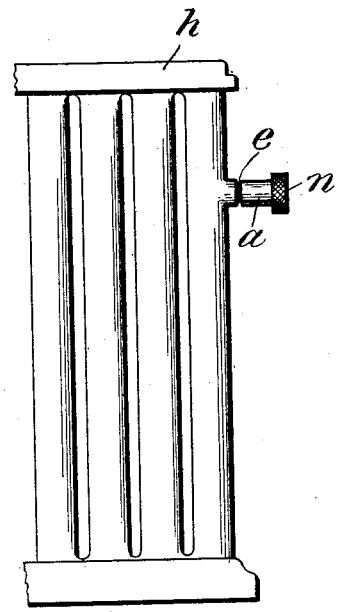
Figure 3:
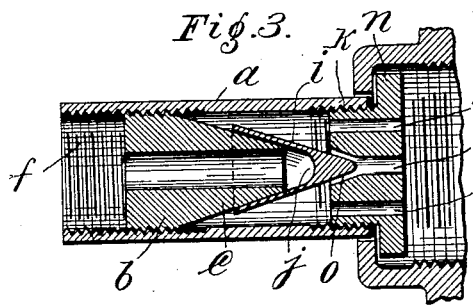
Figure 4:
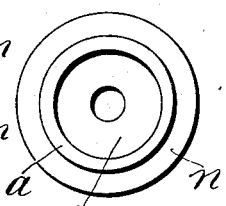
Figure 5:
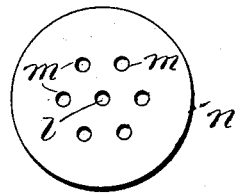
Figure 6:
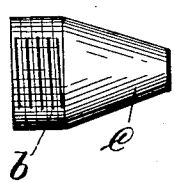
Figure 7:
Figure 8:
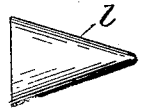
Figure 9:
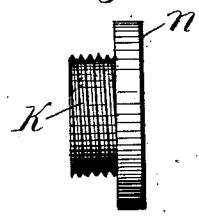

Figure 1 is an elevation of a gas-meter with my improved device attached for preventing regurgitation of the gas. Fig. 2 is an elevation of a steam or hot-water radiator with my improved device employed for venting the same, the coupling-cap for connecting in a line of pipe being omitted. Fig. 3 is a longitudinal section of the same device. Fig. 4 is an end elevation of the device as seen looking at the left-hand end of Fig. 3. Figs. 5, 6, 7, 8, and 9, inclusive, represent several parts of the device in side view and detached from each other.

The case or body $a$ of the device is in the form of a short tube internally threaded at each end like an ordinary pipe-coupling. A centrally and longitudinally perforated plug having a screw-threaded base $b$ and a taper part $c$ is screwed into one end of said body $a$ far enough beyond the end to admit the end of a gas-pipe, as $d$, or a nipple, as $e$, to be screwed in at $f$ for connecting the device to a meter $g$ or to a radiator $h$, the point of said plug being directed inward of the case. A conical valve $i$, having a taper socket $j$ in the base, adapted to fit the taper $c$ of the plug, is applied to the taper inner end of said plug. A plug $k$ is screwed into the other end of case $a$, which is centrally perforated at $l$, said perforation being suitably flared at the inner end to form a taper seat $o$ for the point of valve $i$. The plug $k$ has other perforations $m$, and it has a flange $n$, such as may be used with the cap $o'$ of an ordinary pipe-union, for connecting the device to a section $p$ of gas-pipe leading from the meter. This flange may have a milled edge, as represented in Fig. 2, to facilitate manipulating the plug when the device is used for venting a radiator or other thing to be vented.

When used as a gas-check, the plug $b\ c$ will be adjusted relatively to plug $k$, so that valve $i$ may have a little play forward and backward between point $c$ and seat $o$, allowing said valve to be opened by the gas-pressure under the valve for free outflow. It will be seen that regurgitating pressure of the gas will close valve $i$ on point $c$ and prevent return flow into the meter of gas having once passed and been registered and being registered again, which is a peculiarity of elastic vapors under light pressure. When the device is to be used for a vent, plug $b\ c$ is to be set farther into case $a$, so that plug $k$ on being screwed "home" will close valve $i$ on point $c$ and prevent outflow, but will be opened by the pressure behind it when the plug is slightly slackened and allow the vent operation to take place.

Thus I have provided in one simple construction a device which is applicable for two different effects without change, except the slight different adjustment of the plug $b\ c$, and this adjustment is alike useful in setting it relatively to plug $k$ for both uses, in one case being to allow the play for the opening of the valve and in the other case for enabling the plug $k$ to come tight in the end of case $a$ at the same time that the valve $i$ closes tight on point $c$.

What I claim as my invention is—

1. The combination of the tubular case internally screw-threaded at each end, longitudinally-perforated taper plug set adjustably in one end of said case beyond the extremity of the case and with its point inward, the conical and taper-socketed valve on said taper point of said plug, another longitudinally-perforated plug threaded in the other end of said case, and having a flange-head and adapted to control said valve relatively to the taper plug.

2. The combination of the tubular case internally screw-threaded at each end, longitudinally-perforated taper plug set adjustably in one end of said case beyond the extremity of the case and with its point inward, the conical and taper-socketed valve on said taper point of said plug, another longitudinally-perforated plug threaded in the other end of said case and having a flange-head and adapted to control said valve relatively to the taper plug and a pipe-union-joint cap on said plug.

Signed at New York this 5th day of March, 1903.

ROBERT BYERS.

Witnesses:
C. SEDGWICK,
A. P. THAYER.